(12) United States Patent
Kim et al.

(10) Patent No.: US 12,230,834 B2
(45) Date of Patent: Feb. 18, 2025

(54) SEPARATOR INCLUDING POROUS SUBSTRATE AND COATING LAYER OF ACRYLIC COPOLYMER, ORGANIC FILLER, AND INORGANIC PARTICLES, AND LITHIUM SECONDARY BATTERY INCLUDING THE SAME

(71) Applicant: Samsung SDI Co., Ltd., Yongin-si (KR)

(72) Inventors: Gain Kim, Yongin-si (KR); Yeonjoo Choi, Yongin-si (KR); Yangseob Kim, Yongin-si (KR); Yongkyoung Kim, Yongin-si (KR); Dongwan Seo, Yongin-si (KR); Jungyoon Lee, Yongin-si (KR); Hyeonsun Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 170 days.

(21) Appl. No.: 17/414,043

(22) PCT Filed: Jul. 23, 2019

(86) PCT No.: PCT/KR2019/009085
§ 371 (c)(1),
(2) Date: Jun. 15, 2021

(87) PCT Pub. No.: WO2020/149478
PCT Pub. Date: Jul. 23, 2020

(65) Prior Publication Data
US 2022/0052419 A1 Feb. 17, 2022

(30) Foreign Application Priority Data
Jan. 16, 2019 (KR) .................. 10-2019-0005932

(51) Int. Cl.
*H01M 50/446* (2021.01)
*H01M 10/0525* (2010.01)
*H01M 50/443* (2021.01)

(52) U.S. Cl.
CPC ..... *H01M 50/446* (2021.01); *H01M 10/0525* (2013.01); *H01M 50/443* (2021.01)

(58) Field of Classification Search
CPC .................... H01M 50/446; H01M 50/443
(Continued)

(56) References Cited

U.S. PATENT DOCUMENTS

2006/0263693 A1 11/2006 Kim et al.
2010/0233409 A1 9/2010 Kamiya et al.
(Continued)

FOREIGN PATENT DOCUMENTS

CN 1855584 A 11/2006
CN 102770984 A 11/2012
(Continued)

OTHER PUBLICATIONS

"derive." New Oxford American Dictionary. Eds. Stevenson, Angus, and Christine A. Lindberg. : Oxford University Press, 2011. Oxford Reference. Date Accessed Aug. 10, 2023 <https://www.oxfordreference.com/view/10.1093/acref/9780195392883.001.0001/m_en_us1239627>. (Year: 2011).*

(Continued)

*Primary Examiner* — Sean P Cullen
(74) *Attorney, Agent, or Firm* — Lewis Roca Rothgerber Christie LLP

(57) ABSTRACT

The present invention relates to a separator for a lithium secondary battery, and a lithium secondary battery including the same. The separator includes a porous substrate, and a coating layer on at least one surface of the porous substrate, wherein the coating layer includes an acrylic copolymer (Continued)

including a first structural unit derived from (meth)acrylamide, and a second structural unit including at least one of a structural unit derived from (meth)acrylic acid or (meth)acrylate, and a structural unit derived from (meth)acrylamidosulfonic acid or a salt thereof; an organic filler; and inorganic particles, wherein the organic filler is included in an amount of 0.1 to 50 wt % based on a total amount of the organic filler and the inorganic particles.

13 Claims, 1 Drawing Sheet

(58) Field of Classification Search
USPC .......................................... 429/144, 251, 254
See application file for complete search history.

(56) References Cited

U.S. PATENT DOCUMENTS

| | | |
|---|---|---|
| 2011/0318630 A1 | 12/2011 | Wakizaka et al. |
| 2012/0115036 A1 | 5/2012 | Lee et al. |
| 2013/0017429 A1 | 1/2013 | Ha et al. |
| 2013/0224555 A1 | 8/2013 | Hong et al. |
| 2013/0252066 A1 | 9/2013 | Yeou et al. |
| 2013/0302661 A1 | 11/2013 | Kim et al. |
| 2013/0323569 A1 | 12/2013 | Yeou et al. |
| 2013/0330590 A1 | 12/2013 | Toyoda |
| 2014/0050965 A1 | 2/2014 | Ha et al. |
| 2014/0120402 A1 | 5/2014 | Yu et al. |
| 2014/0186680 A1 | 7/2014 | Kim et al. |
| 2014/0272532 A1 | 9/2014 | Park et al. |
| 2015/0010815 A1 | 1/2015 | Chung et al. |
| 2015/0030933 A1 | 1/2015 | Goetzen et al. |
| 2015/0050554 A1 | 2/2015 | Fukumine et al. |
| 2015/0111086 A1 | 4/2015 | Arnold et al. |
| 2016/0013465 A1* | 1/2016 | Akiike .................. H01M 50/42 524/430 |
| 2016/0141581 A1 | 5/2016 | Sasaki et al. |
| 2016/0149184 A1 | 5/2016 | Nam et al. |
| 2016/0149190 A1 | 5/2016 | Fukuchi |
| 2016/0344007 A1 | 11/2016 | Toyoda et al. |
| 2017/0162848 A1 | 6/2017 | Pan et al. |
| 2017/0200932 A1 | 7/2017 | Sasaki et al. |
| 2017/0301903 A1 | 10/2017 | Choi et al. |
| 2017/0326863 A1 | 11/2017 | Wang et al. |
| 2017/0338461 A1 | 11/2017 | Seo et al. |
| 2018/0053963 A1 | 2/2018 | Tanaka |
| 2018/0114966 A1* | 4/2018 | Yasuda ............... H01M 50/451 |
| 2018/0337381 A1 | 11/2018 | Seo et al. |
| 2018/0351149 A1 | 12/2018 | Akiike et al. |
| 2018/0358649 A1 | 12/2018 | Inoue et al. |
| 2019/0013504 A1 | 1/2019 | Choi et al. |
| 2019/0106521 A1* | 4/2019 | Takamatsu ............ H01M 4/666 |
| 2019/0245183 A1 | 8/2019 | Jeong et al. |
| 2020/0388808 A1 | 12/2020 | Choi et al. |
| 2021/0226299 A1 | 7/2021 | Choi et al. |
| 2021/0234235 A1 | 7/2021 | Kang et al. |
| 2022/0013859 A1 | 1/2022 | Kim et al. |
| 2022/0029244 A1 | 1/2022 | Kim et al. |
| 2022/0037739 A1 | 2/2022 | Lee et al. |
| 2022/0037741 A1 | 2/2022 | Lee et al. |
| 2022/0102810 A1 | 3/2022 | Kim et al. |

FOREIGN PATENT DOCUMENTS

| | | | |
|---|---|---|---|
| CN | 102893427 A | 1/2013 | |
| CN | 103390740 A | 11/2013 | |
| CN | 103718336 A | 4/2014 | |
| CN | 103857732 A | 6/2014 | |
| CN | 104277746 A | 1/2015 | |
| CN | 104521031 A | 4/2015 | |
| CN | 105324868 A | 2/2016 | |
| CN | 105378989 A | 3/2016 | |
| CN | 105440770 A | 3/2016 | |
| CN | 105531854 A | 4/2016 | |
| CN | 105934838 A | 9/2016 | |
| CN | 106328865 A | 1/2017 | |
| CN | 106463675 A | 2/2017 | |
| CN | 107394087 A | 11/2017 | |
| CN | 107851765 A | 3/2018 | |
| CN | 108155328 A | 6/2018 | |
| CN | 108305970 A | 7/2018 | |
| CN | 108463904 A | 8/2018 | |
| CN | 108666499 A | 10/2018 | |
| CN | 108963148 A | 12/2018 | |
| CN | 109037564 A | 12/2018 | |
| CN | 109075291 A | 12/2018 | |
| CN | 109103397 A | 12/2018 | |
| CN | 113228397 A | 8/2021 | |
| EP | 2549564 A2 | 1/2013 | |
| EP | 2779277 A1 | 9/2014 | |
| EP | 3246969 A1 | 11/2017 | |
| EP | 3588636 A1 | 1/2020 | |
| EP | 3748730 A1 | 12/2020 | |
| EP | 3855529 A1 | 7/2021 | |
| EP | 3902027 A1 | 10/2021 | |
| EP | 3902028 A1 | 10/2021 | |
| EP | 3905381 A | 11/2021 | |
| EP | 3907781 A1 | 11/2021 | |
| JP | 03-175023 A | 7/1991 | |
| JP | 2011-832 A | 1/2011 | |
| JP | 2011-5670 A | 1/2011 | |
| JP | 2014225410 A * | 12/2014 | |
| JP | 2014229406 A * | 12/2014 | |
| JP | 2015-088253 A | 5/2015 | |
| JP | 2015-88253 A | 5/2015 | |
| JP | 2016-105398 A | 6/2016 | |
| JP | 2017-050149 A | 3/2017 | |
| JP | 2017-103206 A | 6/2017 | |
| JP | 2018-26266 A | 2/2018 | |
| JP | 2018026266 A * | 2/2018 | ........... C09D 133/26 |
| JP | 2018-34496 A | 3/2018 | |
| JP | 2018-092701 A | 6/2018 | |
| JP | 2019-57486 A | 4/2019 | |
| KR | 10-2010-0094062 A | 8/2010 | |
| KR | 10-2011-0097715 A | 8/2011 | |
| KR | 10-2011-0104791 A | 9/2011 | |
| KR | 10-2012-0093772 A | 8/2012 | |
| KR | 10-2012-0097238 A | 9/2012 | |
| KR | 10-1254693 B1 | 4/2013 | |
| KR | 10-2014-0044757 A | 4/2014 | |
| KR | 10-2014-0116415 A | 10/2014 | |
| KR | 10-2014-0147742 A | 12/2014 | |
| KR | 10-2015-0034825 A | 4/2015 | |
| KR | 2015-0037394 | 4/2015 | |
| KR | 10-2016-0033692 A | 3/2016 | |
| KR | 10-2016-0061165 A | 5/2016 | |
| KR | 10-2016-0109669 A | 9/2016 | |
| KR | 10-2016-0118979 A | 10/2016 | |
| KR | 10-2017-0003020 A | 1/2017 | |
| KR | 10-2017-0045438 A | 4/2017 | |
| KR | 10-2017-0084597 A | 7/2017 | |
| KR | 10-2017-0095024 A | 8/2017 | |
| KR | 10-2017-0129645 A | 11/2017 | |
| KR | 10-2018-0003177 A | 1/2018 | |
| KR | 10-1868240 B1 | 6/2018 | |
| KR | 10-2018-0099560 A | 9/2018 | |
| KR | 10-2018-0099561 A | 9/2018 | |
| KR | 10-2018-0109740 A | 10/2018 | |
| WO | WO 2009/060787 A1 | 5/2009 | |
| WO | WO 2010/074205 A1 | 7/2010 | |
| WO | 2014/054919 A1 | 4/2014 | |
| WO | WO-2014136799 A1 * | 9/2014 | ........... H01M 2/145 |
| WO | WO 2015/008626 A1 | 1/2015 | |
| WO | 2015/076571 A1 | 5/2015 | |
| WO | 2015/122322 A1 | 8/2015 | |
| WO | WO-2016157899 A1 * | 10/2016 | ........... B01D 71/022 |

(56) References Cited

FOREIGN PATENT DOCUMENTS

WO     WO 2018/147714 A1     8/2018
WO     WO 2018/155345 A1     8/2018

OTHER PUBLICATIONS

Chinese Office Action, with English translation, dated Sep. 20, 2022, issued in Chinese Patent Application No. 201980083245.6 (28 pages).
Chinese Office Action, with English translation, dated Sep. 30, 2022, issued in Chinese Patent Application No. 201980085835.2 (15 pages).
EPO Extended European Search Report dated Oct. 14, 2022, issued in European Patent Application No. 19904249.0 (9 pages).
Chinese Office Action, with English translation, dated Oct. 24, 2022, issued in corresponding Chinese Patent Application No. 201980087908.1 (18 pages).
EPO Extended European Search Report dated Dec. 6, 2022, issued in corresponding European Patent Application No. 19910153.6 (9 pages).
EPO Extended European Search Report dated Aug. 3, 2022, issued in European Patent Application No. 19898125.0 (11 pages).
Chinese Office Action, with English translation, dated Aug. 3, 2022, issued in Chinese Patent Application No. 201980055198.4 (20 pages).
Ghosh, Prof. Premamoy, "Polymer Science Fundamentals of Polymer Science: Molecular Weights of Polymers," Sep. 2006, XP055608363, 22 pages.
International Search Report for corresponding Application No. PCT/KR2019/009085 dated Oct. 30, 2019, 4pp.
Chinese Notice of Allowance, with English translation, dated Jan. 13, 2023, issued in Chinese Patent Application No. 201980055198.4 (8 pages).
EPO Extended European Search Report dated May 17, 2022, issued in European Patent Application No. 19861770.6 (10 pages).
Notification of Third Party Observation dated Jun. 6, 2022, 15 pages.
Japanese Office Action dated Jun. 20, 2022, issued in Japanese Patent Application No. 2021-5135321 (6 pages).
EPO Third Party Observations dated Sep. 21, 2021, issued in European Patent Application No. 19861770.6 (20 pages).
International Search Report for Application No. PCT/KR2019/008767 dated Oct. 25, 2019, 4pp.
International Search Report for Application No. PCT/KR2019/010128 dated Nov. 26, 2019, 6pp.
International Search Report for Application No. PCT/KR2019/010130 dated Nov. 26, 2019, 4pp.
Chinese Office Action, with English translation, dated Apr. 13, 2023, issued in Chinese Patent Application No. 201980083245.6 (6 pages).
Chinese Office Action, with English translation, dated Apr. 23, 2023, issued in Chinese Patent Application No. 201980085835.2 (15 pages).
U.S. Office Action dated Jun. 14, 2023, issued in U.S. Appl. No. 17/296,501 (29 pages).
Chinese Office Action for Chinese Application No. 201980084182.6 dated May 31, 2023, 19 pages.
Chinese Office Action for CN Application No. 201980082244.X dated Sep. 26, 2022, 14 pages.
Chinese Office Action for CN Application No. 201980084182.6 dated Sep. 29, 2022, 16 pages.
Chinese Office Action for CN Application No. 201980085911.X dated Oct. 8, 2022, 21 pages.
Chinese Office Action for CN Application No. 201980087928.9 dated Oct. 9, 2022, 21 pages.
Chinese Office Action, with English translation, dated Apr. 20, 2023, issued in Chinese Patent Application No. CN 201980082244.X (13 pages).
Chinese Office Action, with English translation, dated Apr. 3, 2023, issued in Chinese Patent Application No. 201980087928.9 (28 pages).
Chinese Office Action, with English translation, dated Mar. 8, 2023, issued in Chinese Patent Application No. 201980085911.X (20 pages).
Chinese Office Action, with English translation, dated Jun. 22, 2023, issued in Chinese Patent Application No. 201980087908.1 (23 pages).
Chinese Decision of Rejection, with English translation, dated Jul. 1, 2023, issued in Chinese Patent Application No. 201980085911.X (21 pages).
Chinese Office Action, with English translation, dated Aug. 12, 2023, issued in Chinese Patent Application No. 201980082244.X (13 pages).
EPO Extended European Search Report dated Dec. 20, 2022, issued in European Patent Application No. 19902175.9 (8 pages).
European Search Report for EP 19898811.5 dated Aug. 3, 2022, 11 pages.
European Search Report for EP 19902841.6 dated Aug. 12, 2022, 12 pages.
European Search Report for EP 19906911.3 dated Oct. 14, 2022, 7 pages.
Fedelich, "Application Handbook Thermal Analysis of Polymers Selected Applications Thermal Analysis", Jan. 1, 2013, XP055608279, Retrieved from the Internet: URL: https://www.mt.com/dam/LabDiv/guides-glen/ta-polymer/TA_Polymers_Selected_Apps_EN.pdf [retrieved on Jul. 24, 2019], 40 pgs.
Ghosh, "Polymer Science Fundamentals of Polymer Science Molecular Weights of Polymers Contents Introduction Concept of Average Molecular Weight Number Average Molecular Weight Membrane Osmometry Weight Average Molecular Weight Assessment of Shape of Polymer Molecules Viscosity Average Molecular Weight Gener", Sep. 21, 2006, XP055608363, 22 pgs.
International Search Report for Application No. PCT/KR2019/009945 dated Nov. 20, 2019, 4pp.
International Search Report for Application No. PCT/KR2019/010129 dated Nov. 28, 2019, 4pp.
International Search Report for Application No. PCT/KR2019/010131 dated Nov. 28, 2019, 4 pp.
International Search Report for corresponding Application No. PCT/KR2019/009136 dated Oct. 30, 2019, 4pp.
Limparyoon, Nattawut, et al., "Acrylamide/2-acrylamido-2-methylpropane sulfonic acid and associated sodium salt superabsorbent copolymer nanocomposites with mica as fire retardants", Polymer Degradation and Stability, vol. 96, No. 6, pp. 1054-1063, 2011.
U.S. Final Office Action dated Aug. 18, 2023, issued in U.S. Appl. No. 17/414,043 (19 pages).
U.S. Final Office Action dated Sep. 25, 2023, issued in U.S. Appl. No. 17/296,501 (26 pages).
Chinese Office Action, with English translation, dated Sep. 19, 2023, issued in Chinese Patent Application No. 201980087908.1 (19 pages).
Chinese Notice of Allowance, with English translation, dated Sep. 27, 2023, issued in Chinese Patent Application No. 201980085835.2 (6 pages).
Machine translation of Japanese Patent Publication No. 2018-026266, published Feb. 15, 2018. (Year: 2018).
U.S. Office Action dated Dec. 14, 2023, issued in U.S. Appl. No. 17/273,238 (19 pages).
U.S. Office Action dated Dec. 26, 2023, issued in U.S. Appl. No. 17/296,516 (16 pages).
US Office Action dated Jan. 31, 2024, issued in U.S. Appl. No. 17/296,501 (26 pages).
Final Rejection for U.S. Appl. No. 17/296,516 dated May 3, 2024, 14 pages.
Final Rejection for U.S. Appl. No. 17/296,501 dated May 14, 2024, 30 pages.
Machine translation of WO 2015/122322, 27 pages.
Final Rejection for U.S. Appl. No. 17/273,238 dated May 31, 2024, 21 pages.

(56) References Cited

OTHER PUBLICATIONS

Machine translation of WIPO Patent Publication 2015-008626, published Jan. 22, 2015. (Year: 2015).
US Office Action dated Aug. 6, 2024, issued in U.S. Appl. No. 17/296,501 (30 pages).
US Office Action dated Sep. 24, 2024, issued in U.S. Appl. No. 17/273,238 (17 pages).

\* cited by examiner

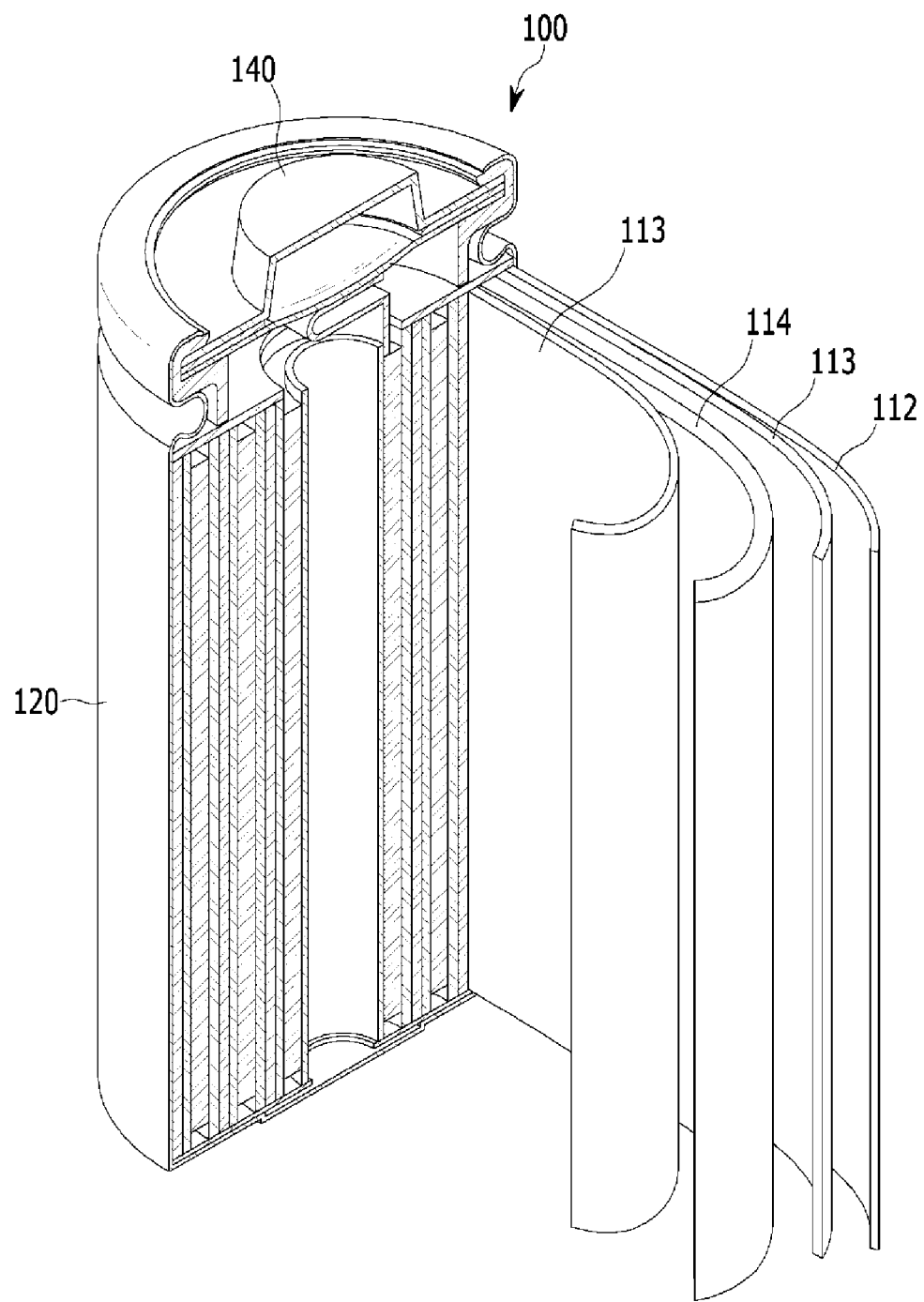

SEPARATOR INCLUDING POROUS SUBSTRATE AND COATING LAYER OF ACRYLIC COPOLYMER, ORGANIC FILLER, AND INORGANIC PARTICLES, AND LITHIUM SECONDARY BATTERY INCLUDING THE SAME

CROSS-REFERENCE TO RELATED APPLICATIONS

This application is a U.S. National Phase Patent Application of International Application Number PCT/KR2019/009085, filed on Jul. 23, 2019, which claims priority to Korean Patent Application Number 10-2019-0005932, filed on Jan. 16, 2019, the entire content of both of which is incorporated herein by reference.

TECHNICAL FIELD

A separator for a lithium secondary battery and a lithium secondary battery including the same are disclosed.

BACKGROUND ART

A separator for an electrochemical battery is an intermediate film that separates a positive electrode and a negative electrode in a battery, and maintains ion conductivity continuously to enable charge and discharge of a battery. When a battery is exposed to a high temperature environment due to abnormal behavior, a separator may be mechanically shrinks or is damaged due to melting characteristics at a low temperature. Herein, the positive and negative electrodes contact each other and may cause an explosion of the battery. In order to overcome this problem, technology of suppressing shrinkage of a separator and ensuring stability of a battery is required.

In this regard, a method of increasing heat resistance of the separator by mixing inorganic particles having large heat resistance with an organic binder having adherence and coating them on the separator has been known. However, this conventional method may not sufficiently securing desired adhesive strength and in addition, is difficult to universally apply to separators having various sizes and shapes.

DISCLOSURE

Technical Problem

A separator for a lithium secondary battery having high heat resistance, strong adhesive strength, withstand voltage characteristics, and moisture resistance, and a lithium secondary battery including the same are provided.

Technical Solution

In an embodiment, a separator for a lithium secondary battery includes a porous substrate, and a coating layer on at least one surface of the porous substrate, wherein the coating layer includes an acrylic copolymer including a first structural unit derived from (meth)acrylamide, and a second structural unit including at least one of a structural unit derived from (meth)acrylic acid or (meth)acrylate, and a structural unit derived from (meth)acrylamidosulfonic acid or a salt thereof; an organic filler; and inorganic particles, wherein the organic filler is included in an amount of 0.1 to 50 wt % based on a total amount of the organic filler and the inorganic particles.

Another embodiment provides a lithium secondary battery including a positive electrode, a negative electrode, and a separator for a lithium secondary battery between the positive electrode and the negative electrode.

Advantageous Effects

A lithium secondary battery including a separator for a lithium secondary battery having excellent heat resistance and adhesive strength and enhanced withstand voltage characteristics and moisture resistance may be implemented.

DESCRIPTION OF THE DRAWINGS

The drawing is an exploded perspective view of a lithium secondary battery according to an embodiment.

DESCRIPTION OF SYMBOLS

100: lithium secondary battery
112: negative electrode
113: separator
114: positive electrode
120: battery case
140: sealing member

MODE FOR INVENTION

Hereinafter, embodiments of the present invention are described in detail. However, these embodiments are exemplary, the present invention is not limited thereto and the present invention is defined by the scope of claims.

In the present specification, when a definition is not otherwise provided "substituted" refers to replacement of hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

As used herein, when a definition is not otherwise provided, "hetero" refers to one including 1 to 3 heteroatoms selected from N, O, S, and P.

A separator for a lithium secondary battery according to an embodiment includes a porous substrate and a coating layer on one surface or both surfaces of the porous substrate.

The porous substrate may have a plurality of pore and may generally be a porous substrate used in an electrochemical device. Non-limiting examples of the porous substrate may be a polymer film formed of a polymer, or a copolymer or a mixture of two or more selected from polyolefin such as polyethylene, polypropylene, and the like, a polyester such as polyethylene terephthalate, polybutylene terephthalate, and the like, polyacetal, polyamide, polyimide, polycarbonate, polyetheretherketone, polyaryletherketone, polyetherimide, polyamideimide, polybenzimidazole, polyether sulfone, a polyphenylene oxide, a cyclic olefin copolymer, polyphenylene sulfide, polyethylene naphthalate, a glass fiber, Teflon, and polytetrafluoroethylene.

The porous substrate may be, for example, a polyolefin-based substrate including polyolefin, and the polyolefin-based substrate has excellent shutdown function, thereby contributing to improvement of the safety of a battery. The polyolefin-based substrate may be, for example, selected from selected from a polyethylene single film, a polypropylene single film, a polyethylene/polypropylene double film, a polypropylene/polyethylene/polypropylene triple film, and a polyethylene/polypropylene/polyethylene triple film. In addition, the polyolefin-based resin may include a non-olefin resin in addition to an olefin resin or a copolymer of olefin and a non-olefin monomer.

The porous substrate may have a thickness of about 1 μm to 40 μm, for example 1 μm to 30 μm, 1 μm to 20 μm, 5 μm to 15 μm, or 10 μm to 15 μm.

The coating layer according to an embodiment includes an acrylic copolymer including a first structural unit derived from (meth)acrylamide, and a second structural unit including at least one of a structural unit derived from (meth) acrylic acid or (meth)acrylate, and a structural unit derived from (meth)acrylamidosulfonic acid or a salt thereof; an organic filler; and inorganic particles.

The first structural unit derived from the (meth)acrylamide includes an amide functional group (–NH$_2$) in the structural unit. The —NH$_2$ functional group may improve adhesion characteristics of the porous substrate and the electrode, and by forming a hydrogen bond with the —OH functional group of the inorganic particles, the inorganic particles may be more firmly fixed in the coating layer, and thus the heat resistance of the separator may be strengthened.

The structural unit derived from the (meth)acrylic acid or (meth)acrylate included in the second structural unit may play a role of fixing the organic filler and the inorganic particles on the porous substrate, and simultaneously, provide adherence, so that a coating layer may be well adhered to the porous substrate and the electrode and accordingly, contribute to improving heat resistance and air permeability of the separator. In addition, the structural unit derived from the (meth)acrylic acid or (meth)acrylate includes a carboxyl functional group (—C(=O)O—) in the structural unit and thus may contribute to improving dispersion of coating slurry.

In addition, the structural unit derived from the (meth) acrylamidosulfonic acid or the salt thereof included in the second structural unit includes a bulky functional group, thereby reducing the mobility of the copolymer including the same and enhancing the heat resistance of the separator.

In an embodiment, the acrylic copolymer may be a two component copolymer including a first structural unit derived from (meth)acrylamide and a second structural unit derived from (meth)acrylic acid or (meth)acrylate; a two component copolymer including a first structural unit derived from (meth)acrylamide and a second structural unit derived from (meth)acrylamidosulfonic acid or a salt thereof; or a three component copolymer including a first structural unit derived from (meth)acrylamide, and a second structural unit including a structural unit derived from (meth)acrylic acid or (meth)acrylate, and a structural unit derived from (meth)acrylamidosulfonic acid or a salt thereof.

The coating layer disposed on the separator for a lithium secondary battery according to an embodiment may include an organic filler and inorganic particles along with the aforementioned acrylic copolymer, thereby enhancing withstand voltage characteristics.

In particular, as a portion of the volume occupied by the inorganic particles is replaced with an organic filler, an increase in the moisture content due to the specific surface area of the inorganic particles is suppressed, thereby contributing to improvement of cell cycle-life characteristics.

For example, a volume ratio of the inorganic particles and the organic filler may be 40:1 to 1:3, for a specific example, 4:1 to 1:2, and for example, 3:1 to 1:1.

As the inorganic particles are replaced with the organic filler in the above ratio, an effect of suppressing an increase in the moisture content due to the specific surface area of the inorganic particles may be maximized.

Meanwhile, the organic filler may be included in an amount of 0.1 wt % to 50 wt % based on a total amount of the organic filler and the inorganic particles. When the content of the organic filler is within the above range, excellent heat resistance may be secured.

For example, the organic filler may be included in an amount of 1 wt % to 50 wt %, 3 wt % to 50 wt %, or 5 wt % to 50 wt % based on the total amount of the organic filler and the inorganic particles.

For example, the organic filler may be included in an amount of 5 wt %, 10 wt %, 20 wt %, 25 wt % or 50 wt % based on the total amount of the organic filler and the inorganic particles, but is not limited thereto.

The coating layer may include the acrylic copolymer: organic filler and inorganic particles in a weight ratio of 1:20 to 1:40, desirably 1:25 to 1:40, more desirably 1:25 to 1:35. When the acrylic copolymer and inorganic particles are included in the above range in the coating layer, the separator may exhibit excellent heat resistance and air permeability.

The average particle diameter of the organic filler may be 0.1 μm to 0.5 μm, for example 0.1 μm to 0.3 μm, for example 0.2 μm to 0.4 μm.

When an organic filler having an average particle diameter within the above range is used, a separator having excellent heat resistance may be provided by imparting excellent strength to the coating layer.

The organic filler may be at least one organic compound selected from an acrylate-based compound and a derivative thereof, a diallyl phthalate-based compound and a derivative thereof, a polyimide-based compound and a derivative thereof, a copolymer thereof, and a mixture thereof.

The organic filler may be specifically obtained through the following methods.

After dispersing the acrylate-based compound in an emulsifier, a trace amount of an aqueous copper sulfate solution is added thereto, and then a redox polymerization initiator is added thereto, followed by emulsion polymerization to obtain the organic filler.

Further, the organic filler may be obtained by polymerizing the diallyl phthalate-based compound in the presence of a water-soluble polymerization initiator.

In addition, the organic filler may be obtained by reacting an aldehyde-based compound with emulsion particles composed of a core part made of a hydrophobic polymer and a shell part made of a hydrophilic polymer. At this time, the hydrophobic polymer has a glass transition temperature of greater than or equal 20° C. and an acetacetyl group, and the hydrophilic polymer has a functional group capable of being dispersed in water.

In addition, an organic filler may be obtained as follows: after preparing a polyimide fine particle dispersion in which the polyamic acid fine particles dispersed in a hydrophilic solvent are imidized with acetic anhydride, pyridine, etc., the hydrophilic solvent is removed by centrifugation, and then an aqueous surfactant solution is added to the remaining by-products to replace water to obtain the organic filler.

More specifically, the organic filler may have a highly crosslinked structure.

In an embodiment of the present invention, the organic filler may be a polymer material such as an acrylate-based or methacrylate-based polymer or copolymer. In this case, the glass transition temperature of the polymer may be controlled by adjusting the monomer ratio of the polymer or copolymer. For example, an acrylate-based or methacrylate-based polymer or copolymer having a glass transition temperature of 30° C. to 90° C. can be used. However, the present invention is not limited thereto.

The inorganic particles may prevent a separator from being sharply shrunk due to a temperature increase. The inorganic particles may be a ceramic material capable of improving heat resistance, for example, $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof, but are not limited thereto. The inorganic particles may have a spherical shape, a sheet shape, a cubic shape, or an amorphous shape. The inorganic particles may have an average particle diameter of 0.3 μm to 0.7 μm, for example, 0.4 μm to 0.7 μm, for example 0.5 μm to 0.7 μm.

The average particle diameter of the inorganic particles may be particle size ($D_{50}$) at a volume ratio of 50% in a cumulative size-distribution curve. By using the inorganic particles having an average particle diameter within the ranges, the coating layer may have an appropriate strength, thereby improving heat resistance, durability, and stability of the separator.

The organic filler and inorganic particles may be included in an amount of 50 wt % to 99 wt % based on the coating layer. In an embodiment, the organic filler and inorganic particles may be included in an amount of 70 wt % to 99 wt %, for example, 80 wt % to 99 wt %, 85 wt % to 99 wt %, 90 wt % to 99 wt %, or 95 wt % to 99 wt % based on the coating layer. When the organic filler and inorganic particles are included in the above ranges, the separator for a lithium secondary battery according to an embodiment may exhibit excellent heat resistance, durability, and stability.

The first structural unit may be included in an amount of 55 mol % to 95 mol % based on 100 mol % of the acrylic copolymer, and the second structural unit may be included in an amount of 5 mol % to 45 mol % based on 100 mol % of the acrylic copolymer.

In an embodiment, the first structural unit may be included in an amount of 75 mol % to 95 mol %, for example 80 mol % to 95 mol %, based on 100 mol % of the acrylic copolymer.

Meanwhile, among the second structural units, the structural unit derived from the (meth)acrylic acid or (meth)acrylate may be included in an amount of 0 mol % to 40 mol % based on 100 mol % of the acrylic copolymer, and the structural unit derived from the (meth)acrylamidosulfonic acid or the salt thereof may be included in an amount of 0 mol % to 10 mol % based on 100 mol % of the acrylic copolymer.

For example, the structural unit derived from the (meth)acrylamide may be included in an amount of 80 mol % to 85 mol % based on 100 mol % of the acrylic copolymer, the structural unit derived from the (meth)acrylic acid or (meth)acrylate may be included in an amount of 10 mol % to 15 mol % based on 100 mol % of the acrylic copolymer, and the structural unit derived from the (meth)acrylamidosulfonic acid or the salt thereof may be included in an amount of 5 mol % to 10 mol % based on 100 mol % of the acrylic copolymer.

When the content of each structural unit is within the above range, heat resistance and adhesive strength of the separator may be further improved.

The first structural unit derived from the (meth)acrylamide may be, for example, represented by Chemical Formula 1.

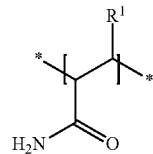

[Chemical Formula 1]

In Chemical Formula 1, $R^1$ is hydrogen or a C1 to C6 alkyl group.

The structural unit derived from (meth)acrylic acid or (meth)acrylate may be for example represented by one of Chemical Formula 2, Chemical Formula 3, and a combination thereof.

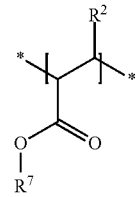

[Chemical Formula 2]

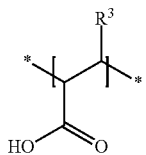

[Chemical Formula 3]

In Chemical Formula 2 and Chemical Formula 3, $R^2$ and $R^3$ may each independently be hydrogen or a C1 to C6 alkyl group and $R^7$ may be a substituted or unsubstituted C1 to C20 alkyl group.

The structural unit derived from (meth)acrylate may be derived from (meth)acrylic acid alkyl ester, (meth)acrylic acid perfluoroalkyl ester, and (meth)acrylate having a functional group in the side chain. It may be, for example, derived from (meth)acrylate alkyl ester. In addition, the number of carbon atoms of the alkyl group or perfluoroalkyl group bound to the non-carbonyl oxygen atom of the (meth) acrylic acid alkyl ester or (meth)acrylic acid perfluoroalkyl ester may be specifically 1 to 20, more specifically 1 to 10, for example, 1 to 5.

Specific examples of the (meth)acrylic acid alkyl ester in which the carbon number of an alkyl group or a perfluoroalkyl group bound to the non-carbonyl oxygen atom is 1 to 5 may be acrylic acid alkyl ester such as methyl acrylate, ethyl acrylate, n-propyl acrylate, isopropyl acrylate, n-butyl acrylate, and t-butyl acrylate, and the like; 2-(perfluoroalkyl) ethyl acrylate such as 2-(perfluorobutyl) ethyl acrylate, 2-(perfluoropentyl) ethyl acrylate, and the like; methacrylic acid alkyl ester such as methyl methacrylate, ethyl methacrylate, n-propyl methacrylate, isopropyl methacrylate, n-butyl methacrylate, and t-butyl methacrylate, and the like; and 2-(perfluoroalkyl) ethyl methacrylate such as 2-(perfluorobutyl) ethyl methacrylate, 2-(perfluoropentyl) ethyl methacrylate, 2-(perfluoroalkyl) ethyl methacrylate, and the like.

Other (meth)acrylic acid alkyl ester may be acrylic acid alkyl ester in which the carbon number of the alkyl group bound to the non-carbonyl oxygen atom is 6 to 18 such as n-hexyl acrylate, 2-ethylhexyl acrylate, nonyl acrylate, lauryl acrylate, stearyl acrylate, cyclohexyl acrylate, and isobornyl acrylate, and the like; methacrylic acid alkyl ester in which the carbon number of the alkyl group bound to the non-carbonyl oxygen atom is 6 to 18 such as n-hexyl methacrylate, 2-ethylhexyl methacrylate, octyl methacrylate, isodecyl methacrylate, lauryl methacrylate, tridecyl methacrylate, stearyl methacrylate, and cyclohexyl methacrylate; 2-(perfluoroalkyl) ethyl acrylate in which the carbon number of the perfluoroalkyl group bound to the non-carbonyl oxygen atom is 6 to 18 such as 2-(perfluorohexyl) ethyl acrylate, 2-(perfluorooctyl) ethyl acrylate, 2-(perfluorononyl) ethyl acrylate, 2-(perfluorodecyl) ethyl acrylate, 2-(perfluorododecyl) ethyl acrylate, 2-(perfluorotetradecyl) ethyl acrylate, 2-(perfluorohexadecyl) ethyl acrylate, and the like; 2-(perfluoroalkyl) ethyl methacrylate in which the carbon number of the perfluoroalkyl group bound to the non-carbonyl oxygen atom is 6 to 18 such as 2-(perfluorohexyl) ethyl methacrylate, 2-(perfluorooctyl) ethyl methacrylate, 2-(perfluorononyl) ethyl methacrylate, 2-(perfluorodecyl) ethyl methacrylate, 2-(perfluorododecyl) ethyl methacrylate, 2-(perfluorotetradecyl) ethyl methacrylate, 2-(perfluorohexadecyl) ethyl methacrylate, and the like.

For example, the structural unit derived from (meth)acrylic acid or (meth)acrylate includes a structural unit represented by Chemical Formula 2 and a structural unit represented by Chemical Formula 3 respectively or both of them together, and when the structural units are included together, the structural units represented by Chemical Formulas 2 and 3 may be included in a mole ratio of 10:1 to 1:1, specifically, 6:1 to 1:1, and more specifically, 3:1 to 1:1.

The structural unit derived from (meth)acrylamidosulfonic acid or a salt thereof may be a structural unit derived from (meth)acrylamido sulfonic acid or (meth)acrylamido sulfonate, wherein the (meth)acrylamido sulfonate may be a conjugate base of the (meth)acrylamido sulfonic acid, (meth)acrylamido sulfonate salt, or a derivative thereof. The structural unit derived from the (meth)acrylamidosulfonic acid or (meth)acrylamidosulfonate may be, for example, represented by one of Chemical Formula 4, Chemical Formula 5, Chemical Formula 6, and a combination thereof.

[Chemical Formula 4]

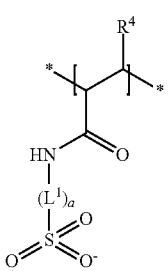

[Chemical Formula 5]

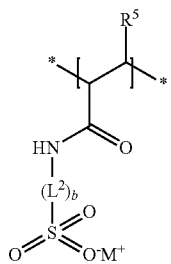

[Chemcial Formula 6]

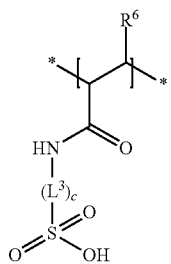

In Chemical Formula 4 to Chemical Formula 6, $R^4$, $R^5$ and $R^6$ are each independently hydrogen or a C1 to C6 alkyl group, $L^1$, $L^2$, and $L^3$ are each independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, a, b, and c are each independently an integer of 0 to 2, and M is an alkali metal, wherein the alkali metal may be for example lithium, sodium, potassium, rubidium, or cesium.

For example, in Chemical Formulas 4 to 6, $L^1$, $L^2$, and $L^3$ may each independently be a substituted or unsubstituted C1 to C10 alkylene group, and a, b and c are each 1.

The structural unit derived from the (meth)acrylamidosulfonic acid and salt thereof may include each of the structural unit represented by Chemical Formula 4, the structural unit represented by Chemical Formula 5, and structural unit represented by Chemical Formula 6, or may include two or more types thereof together. As one example, the structural unit represented by Chemical Formula 5 may be included, and as another example, the structural unit represented by Chemical Formula 5 and the structural unit represented by Chemical Formula 6 may be included together.

When the structural unit represented by Chemical Formula 5 and the structural unit represented by Chemical Formula 6 are included together, the structural unit represented by Chemical Formula 5 and the structural unit represented by Chemical Formula 6 may be included in a mole ratio of 10:1 to 1:2, desirably 5:1 to 1:1, and more desirably 3:1 to 1:1.

The sulfonate group in the structural unit derived from (meth)acrylamidosulfonic acid or the salt thereof may be, for example, a functional group derived from vinyl sulfonic acid, allyl sulfonic acid, styrene sulfonic acid, anethol sulfonic acid, acrylamidoalkane sulfonic acid, sulfoalkyl (meth)acrylate, or a salt thereof.

Herein, the alkane may be a C1 to C20 alkane, a C1 to C10 alkane, or a C1 to C6 alkane, and the alkyl may be a C1 to C20 alkyl, a C1 to C10 alkyl, or a C1 to C6 alkyl. The salt refers to a salt composed of the aforementioned sulfonic acid and appropriate ions. The ions may be, for example, alkali metal ions, and in this case, the salt may be an alkali metal sulfonate salt.

The acrylamidoalkane sulfonic acid may be, for example, 2-acrylamido-2-methylpropane sulfonic acid and the sulfoalkyl (meth)acrylate may be, for example, 2-sulfoethyl (meth)acrylate, 3-sulfopropyl (meth)acrylate, and the like.

The acrylic copolymer may be represented by Chemical Formula 7.

[Chemical Formula 7]

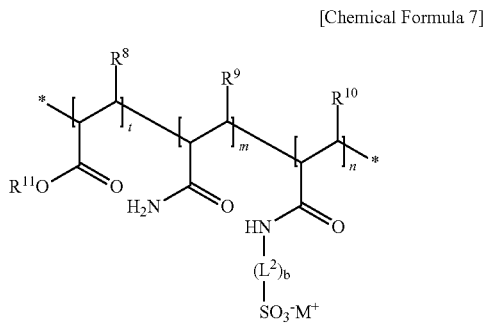

In Chemical Formula 7, $R^8$ to $R^{10}$ are each independently hydrogen or a methyl group, $R^{11}$ is hydrogen or a C1 to C6 alkyl group, $L^2$ is a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, b is one of integers of 0 to 2, M is an alkali metal such as lithium, sodium, potassium, rubidium, or cesium, and the like, and l, m, and n indicate mole ratios of each unit.

For example, in Chemical Formula 7, l+m+n may be 1. In addition, for example, it may be $0.05 \leq (l+n) \leq 0.45$, $0.55 \leq m \leq 0.95$, specifically $0 \leq l \leq 0.4$, and $0 \leq n \leq 0.1$, for example $0.9 \leq m \leq 0.95$, $0 \leq l \leq 0.05$, and $0 \leq n \leq 0.05$.

For example, in Chemical Formula 7, $L^2$ may be a substituted or unsubstituted C1 to C10 alkylene group, and b may be 1.

The degree of substitution of the alkali metal ($M^+$) in the acrylic copolymer may be a mole ratio of the structural unit of (meth)acrylamidosulfonic acid, that is, it may be 0.5 to 1.0, for example, 0.6 to 0.9 or 0.7 to 0.9 with respect to n. When the degree of substitution of the alkali metal satisfies the above ranges, the acrylic copolymer and the separator including the same may exhibit improved adhesive strength, heat resistance, and oxidation resistance.

The acrylic copolymer may further include other units in addition to the units. For example the acrylic copolymer may further include a unit derived from alkyl(meth)acrylate, a unit derived from a diene-based monomer, a unit derived from a styrene-based monomer, an ester group-containing unit, a carbonate group-containing unit, or a combination thereof.

The acrylic copolymer may have various forms, that is, an alternate polymer where the units are alternately distributed, a random polymer the units are randomly distributed, or a graft polymer where a part of structural unit is grafted.

A weight average molecular weight of the acrylic copolymer may be 350,000 to 970,000, for example 450,000 to 970,000, or 450,000 to 700,000. When the weight average molecular weight of the acrylic copolymer satisfies the ranges, the acrylic copolymer and the separator including the same may exhibit excellent adhesive strength, heat resistance, and air permeability. The weight average molecular weight may be polystyrene-reduced average molecular weight measured by gel permeation chromatography.

The acrylic copolymer may be prepared by various methods such as emulsion polymerization, suspension polymerization, massive polymerization, solution polymerization, or bulk polymerization.

Meanwhile, the coating layer may include an initiator and a solvent in addition to the acrylic copolymer.

The initiator may be a photoinitiator, a thermal initiator, or a combination thereof. The photoinitiator may be used for photo-polymerization using ultraviolet rays.

Examples of the photoinitiator may be acetophenones such as diethoxyacetophenone, 2-hydroxy-2-methyl-1-phenylpropan-1-one, benzyldimethylketal, 1-hydroxycyclohexyl-phenylketone, and 2-methyl-2-morphine(4-thiomethylphenyl)propan-1-one; benzoinethers such as benzoinmethylether, benzoinethylether, benzoinisopropylether, and benzoinisobutylether; benzophenones such as benzophenone, o-benzoyl methyl benzoate, 4-phenylbenzophenone, 4-benzoyl-4'-methyldiphenylsulfurous acid, 4-benzoyl-N, N-dimethyl-N-[2-(1-oxo-2-propenyloxy)ethyl] benzenemetanamium bromide, and (4-benzoylbenzyl)trimethylammoniumchloride; thioxanthones such as 2,4-diethylthioxanthone, and 1-chloro-4-dichlorothioxanthone; 2,4,6-trimethylbenzoyldiphenylbenzoyloxide; and the like. These may be used alone or as a mixture of two or more.

The thermal initiator may be used for a thermal polymerization. The thermal initiator may include organic peroxide free radical initiator such as diacylperoxides, peroxyketals, ketone peroxides, hydroperoxides, dialkylperoxides, peroxyesters, peroxydicarbonates, and for example, lauroyl peroxide, benzoyl peroxide, cyclohexanone peroxide, 1,1-bis(t-butylperoxy)-3,3,5-trimethyl cyclohexane, t-butyl hydroperoxide which may be used alone or as a mixture of two or more.

The solvent is not particularly limited as long as it can dissolve or disperse the acrylic polymer, the filler and the initiator described above, and may be alcohols such as methanol, ethanol, isopropyl alcohol, dimethylformamide, dimethylacetamide, tetramethylurea, triethyl phosphate, N-methyl-2-pyrrolidone, dimethyl sulfoxide, acetone, methyl ethyl ketone, methyl isobutyl ketone, cyclohexanone, or a combination thereof, but is not limited thereto.

The curing may be performed through photocuring, thermal curing, or a combination thereof. The photocuring may be for example performed by radiating ultraviolet (UV) of 150 nm to 170 nm for 5 seconds to 60 seconds.

In addition, the thermal curing may be for example performed at 60° C. to 120° C. for 1 hour to 36 hours, for example, 80° C. to 100° C. for 10 hours to 24 hours.

The coating layer may have a thickness of about 1 μm to 5 μm, for example, 1.5 μm to 3 μm.

A ratio of the thickness of the coating layer to the thickness of the porous substrate may be 0.05 to 0.5, for example, 0.05 to 0.4, or 0.05 to 0.3, or 0.1 to 0.2. In this case, the separator including the porous substrate and the coating layer may exhibit excellent air permeability, heat resistance, and adhesive strength.

The separator for a lithium secondary battery according to an embodiment has excellent heat resistance. Specifically, the separator may have a shrinkage rate of less than 10%, or less than or equal to 5%. For example, after the separator is left at 150° C. for 60 minutes, the dry shrinkage rates and shrinkage rates in the vertical direction and the transverse direction of the separator measured may be less than or equal to 5%, or less than 10%.

The separator for a lithium secondary battery according to an embodiment may exhibit excellent air permeability, and specifically less than 160 sec/100 cc·1 μm, for example less than or equal to 150 sec/100 cc·1 μm, or less than or equal to 140 sec/100 cc·1 μm per unit thickness. Herein, the air permeability refers to the time (seconds) it takes for 100 cc of air to pass through the unit thickness of the separator. The air permeability per unit thickness may be obtained by measuring the air permeability for the total thickness of the separator and dividing it by the thickness.

The separator for a lithium secondary battery according to an embodiment may be manufactured by known various methods. For example, the separator for a lithium secondary battery may be formed by coating a composition for forming a coating layer on one surface or both surfaces of the porous substrate and drying the same.

The composition for forming the coating layer may include the aforementioned acrylic copolymer, organic filler, inorganic particles, and solvent. The solvent is not particularly limited if the solvent may dissolve or disperse the acrylic copolymer and the inorganic particles. In an embodiment, the solvent may be an aqueous solvent including water, an alcohol, or a combination thereof, which is environmentally-friendly.

The coating may be, for example spin coating, dip coating, bar coating, die coating, slit coating, roll coating, inkjet printing, and the like, but is not limited thereto.

The drying may be for example performed through natural drying, drying with warm air, hot air, or low humid air, vacuum-drying, or radiation of a far-infrared ray, an electron beam, and the like, but the present invention is not limited thereto. The drying may be for example performed at a temperature of 25° C. to 120° C.

The separator for a lithium secondary battery may be manufactured by lamination, coextrusion, and the like besides the above method.

Hereinafter, a lithium secondary battery including the separator for a lithium secondary battery will be described.

A lithium secondary battery may be classified into a lithium ion battery, a lithium ion polymer battery, and a lithium polymer battery depending on kinds of a separator and an electrolyte and also may be classified to be cylindrical, prismatic, coin-type, pouch-type, and the like depending on shape. In addition, it may be bulk type and thin film type depending on sizes. Structures and manufacturing methods for lithium ion batteries pertaining to this disclosure are well known in the art.

Herein, as an example of a lithium secondary battery, a cylindrical lithium secondary battery is exemplarily described. The drawing is an exploded perspective view of a lithium secondary battery according to an embodiment. Referring to the drawing, a lithium secondary battery 100 according to an embodiment includes a battery cell including a negative electrode 112, a positive electrode 114 facing the negative electrode 112, a separator 113 between the negative electrode 112 and the positive electrode 114, and an electrolyte (not shown) impregnating the negative electrode 112, the positive electrode 114 and the separator 113, and a battery container 120, a battery case containing the battery cell, and a sealing member 140 that seals the container 120.

The positive electrode 114 may include a positive current collector and a positive active material layer formed on the positive current collector. The positive active material layer includes a positive active material, a binder, and optionally a conductive material.

The positive current collector may use aluminum (Al), nickel (Ni), and the like, but is not limited thereto.

The positive active material may use a compound capable of intercalating and deintercallating lithium. Specifically at least one of a composite oxide or a composite phosphate of a metal selected from cobalt, manganese, nickel, aluminum, iron, or a combination thereof and lithium may be used. More specifically, the positive active material may use lithium cobalt oxide, lithium nickel oxide, lithium manganese oxide, lithium nickel cobalt manganese oxide, lithium nickel cobalt aluminum oxide, lithium iron phosphate, or a combination thereof.

The binder improves binding properties of positive active material particles with one another and with a current collector. Specific examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. These may be used alone or as a mixture of two or more.

The conductive material improves conductivity of an electrode. Examples thereof may be natural graphite, artificial graphite, carbon black, a carbon fiber, a metal powder, a metal fiber, and the like, but are not limited thereto. These may be used alone or as a mixture of two or more. The metal powder and the metal fiber may use a metal of copper, nickel, aluminum, silver, and the like.

The negative electrode 112 includes a negative current collector and a negative active material layer formed on the negative current collector.

The negative current collector may use copper, gold, nickel, a copper alloy, but is not limited thereto.

The negative active material layer may include a negative active material, a binder and optionally a conductive material. The negative active material may be a material that reversibly intercalates/deintercalates lithium ions, a lithium metal, a lithium metal alloy, a material capable of doping and dedoping lithium, a transition metal oxide, or a combination thereof.

The material that reversibly intercalates/deintercalates lithium ions may be a carbon material which is any generally-used carbon-based negative active material, and examples thereof may be crystalline carbon, amorphous carbon, or a combination thereof. Examples of the crystalline carbon may be graphite such as amorphous, sheet-shaped, flake-shaped, spherically, shaped or fiber-shaped natural graphite or artificial graphite. Examples of the amorphous carbon may be soft carbon or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material capable of doping and dedoping lithium may be Si, $SiO_x$ (0<x<2), a Si—C composite, a Si—Y alloy, Sn, $SnO_2$, a Sn—C composite, a Sn—Y alloy, and the like, and at least one of these may be mixed with $SiO_2$. The element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, and a combination thereof. The transition metal oxide may be vanadium oxide, lithium vanadium oxide, and the like.

The binder and the conductive material used in the negative electrode 112 may be the same as the binder and conductive material of the positive electrode 114.

The positive electrode 114 and the negative electrode 112 may be manufactured by mixing each active material composition including each active material and a binder, and optionally a conductive material in a solvent, and coating the active material composition on each current collector. Herein, the solvent may be N-methylpyrrolidone, and the like, but is not limited thereto. The electrode manufacturing method is well known, and thus is not described in detail in the present specification.

The electrolyte includes an organic solvent a lithium salt.

The organic solvent serves as a medium for transmitting ions taking part in the electrochemical reaction of a battery. Examples thereof may be selected from a carbonate-based solvent, an ester-based solvent, an ether-based solvent, a ketone-based solvent, an alcohol-based solvent, and an aprotic solvent. The carbonate-based solvent may be dimethyl carbonate, diethyl carbonate, dipropyl carbonate, methylpropyl carbonate, ethylpropyl carbonate, methylethyl carbonate, ethylene carbonate, propylene carbonate, butylene carbonate, and the like, and the ester-based solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. The ether-based solvent may be dibutyl ether, tetraglyme, diglyme, dim ethoxyethane, 2-methyltetrahydrofuran, tetrahydrofuran, and the like, and the ketone-based solvent may be cyclohexanone, and the like. The alcohol-based solvent may be ethanol, isopropyl alcohol, and the like, and the aprotic solvent may be nitriles such as R—CN (R is a C2 to C20 linear, branched, or cyclic hydrocarbon group, a double bond, an aromatic ring, or an ether bond), and the like, amides such as dimethyl formamide, dioxolanes such as 1,3-dioxolane, sulfolanes, and the like.

The organic solvent may be used alone or in a mixture of two or more, and when the organic solvent is used in a mixture of two or more, the mixture ratio may be controlled in accordance with a desirable cell performance.

The lithium salt is dissolved in an organic solvent, supplies lithium ions in a battery, basically operates the lithium secondary battery, and improves lithium ion transportation between positive and negative electrodes therein. Examples of the lithium salt may include two or more selected from $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, LiCl, LiI, $LiB(C_2O_4)_2$, or a combination thereof, but are not limited thereto.

The lithium salt may be used in a concentration ranging from 0.1 M to 2.0 M. When the lithium salt is included within the above concentration range, an electrolyte may have excellent performance and lithium ion mobility due to optimal electrolyte conductivity and viscosity.

Hereinafter, the above aspects of the present invention are illustrated in more detail with reference to examples. However, these examples are exemplary, and the present invention is not limited thereto.

SYNTHESIS EXAMPLE: PREPARATION OF ACRYLIC COPOLYMER

Synthesis Example 1

Distilled water (6361 g), acrylic acid (72.06 g, 1.0 mol), acrylamide (604.1 g, 8.5 mol), potassium persulfate (2.7 g, 0.01 mol), 2-acrylamido-2-methylpropanesulfonic acid (103.6 g, 0.5 mol), and a 5 N lithium hydroxide aqueous solution (1.05 equivalent based on a total amount of 2-acrylamido-2-methylpropanesulfonic acid) were added to a 10 L four-necked flask equipped with a stirrer, a thermometer, and a cooling tube, and an operation of reducing the internal pressure to 10 mmHg with a diaphragm pump and then, returning it to a normal pressure with nitrogen was repeated three times.

The reaction solution was reacted for 12 hours while adjusting the temperature of the reaction solution to be stabilized between 65° C. and 70° C. After cooling to room temperature, the pH of the reaction solution is adjusted to 7 to 8 using a 25% aqueous ammonia solution.

By this method, poly(acrylic acid-co-acrylamide-co-2-acrylamido-2-methylpropanesulfonic acid) sodium salt was prepared. A mole ratio of acrylic acid, acrylamide, and 2-acrylamido-2-methylpropanesulfonic acid was 10:85:5. About 10 mL of the reaction solution (reaction product) was taken to measure the non-volatile component, and the result was 9.5% (theoretical value: 10%).

EXAMPLES: MANUFACTURE OF SEPARATOR FOR SECONDARY BATTERY

Example 1

The acrylic copolymer (10 wt % in distilled water) according to Synthesis Example 1 along with inorganic particles (0.65 μm, boehmite) milled and dispersed at 25° C. for 30 minutes by using a bead mill and crosslinked polymethylmethacrylate (PMMA, 0.3 μm, Nippon Shokubai Co., Ltd.) in a weight ratio of 95:5 were added to a water solvent and then, stirred to prepare organic-inorganic dispersion having a weight ratio of the acrylic copolymer:(the inorganic particles and PMMA)=1:30. Subsequently, water was added thereto so that a total solid content might be 25 wt % to prepare a composition for a coating layer. The composition was coated to be 2-μm thick on a 8 μm-thick polyethylene porous substrate (air permeability: 120 sec/100 cc, puncture strength: 480 kgf, SK global chemical Co., Ltd.) by a bar-coating method and then, dried at 70° C. for 10 minutes to manufacture a separator for a lithium secondary battery.

Example 2

A separator for a secondary battery was manufactured according to the same method as Example 1 except that the inorganic particles and the organic filler were added in a weight ratio of 90:10.

Example 3

A separator for a secondary battery was manufactured according to the same method as Example 1 except that the inorganic particles and the organic filler were added in a weight ratio of 80:20.

Example 4

A separator for a secondary battery was manufactured according to the same method as Example 1 except that the inorganic particles and the organic filler were added in a weight ratio of 75:25.

Example 5

A separator for a secondary battery was manufactured according to the same method as Example 1 except that the inorganic particles and the organic filler were added in a weight ratio of 50:50.

Comparative Example 1

A separator for a secondary battery was manufactured according to the same method as Example 1 except that 100% of the inorganic particles (0.65 μm, Boehmite) milled and dispersed at 25° C. for 30 minutes by using a bead mill was used.

Comparative Example 2

A separator for a secondary battery was manufactured according to the same method as Example 1 except that the inorganic particles and the organic filler were added in a weight ratio of 40:60.

Comparative Example 3

A separator for a secondary battery was manufactured according to the same method as Example 2 except that polyvinyl alcohol (PVA, Weight average molecular weight: 300,000) was used instead of the acrylic copolymer according to Synthesis Example 1.

Comparative Example 4

A separator for a secondary battery was manufactured according to the same method as Example 2 except that polyvinylpyrrolidone (PVP, Weight average molecular weight: 280,000) was used instead of the acrylic copolymer according to Synthesis Example 1.

Comparative Example 5

A separator for a secondary battery was manufactured according to the same method as Example 2 except that carboxylmethyl cellulose (CMC, Weight average molecular weight: 320,000) was used instead of the acrylic copolymer according to Synthesis Example 1.

Comparative Examples 6 to 8

Separators for a lithium secondary batter were manufactured according to the same method as Example 2 except that the acrylic copolymer was used in each composition shown in Table 2.

EVALUATION EXAMPLES

Evaluation Example 1: Adhesive Strength to Substrate

The separators according to Examples 1 to 5, and Comparative Examples 1 to 8 were respectively cut into a size having a width of 12 mm and a length of 50 mm to prepare each sample. After adhering a tape to the coating layer surface of each sample, separating the tape-adhered surface from the substrate about 10 mm to 20 mm apart, and then, clipping the substrate having no tape with an upper grip, the coating layer surface adhered with the tape with a lower grip, and fixing a distance between the grips into 20 mm, the coating layer was pulled toward a direction of 180° and peeled off from each separator. Herein, strength for peeling off up to 40 mm at a peeling speed of 10 mm/min was three times measured and averaged. The peeling strength results are shown in Tables 1 and 2.

Evaluation Example 2: Evaluation of Moisture Characteristics

The moisture content of the separators prepared in Examples 1 to 5 and Comparative Examples 1 to 8 was measured, and the results are shown in Table 1. Herein, the moisture content was measured according to the (Karl-Fischer) measurement method.

When the moisture content is in the range of 300 ppm to 450 ppm, the effect of improving the cell cycle-life can be maximized.

Evaluation Example 3: Evaluation of Withstand Voltage Characteristics

The separators according to Examples 1 to 5 and Comparative Examples 1 and 2 were measured with respect to a breakdown voltage (BDV), and the results are shown in Table 1. BDV was measured by placing each separator between SUS plates and measuring a voltage where boosting stopped (break, short) by using TOS5301 made by KIKISUI Electronics Corp., while the voltage was increased to 0.3 Kv at a boost rate of 8 sec with a current fixed into 0.3 mA in an AC mode. BDV of a porous substrate was 1,157 kV.

Evaluation Example 4: Heat Shrinkage Rate

The separators for a lithium secondary battery according to Examples 1 to 5, and Comparative Examples 1 to 8 were respectively cut into a size of 8 cm×8 cm to prepare samples. The samples after drawing a 5 cm×5 cm-size quadrangle on the surface were inserted between paper or alumina powder, and then after being left at 150° C. in an oven for 1 hour, the samples were taken out of the oven, and sides of the quadrangles drawn on the samples were measured to calculate each shrinkage rate in machine direction (MD) and in a traverse direction (TD). The results are shown in Tables 1 and 2.

TABLE 1

|  | Acrylic copolymer | Inorganic particle: organic filler | Coating thickness (μm) | Adhesive strength (gf) | Moisture content (ppm) | BDV (kV) | Heat shrinkage 150° C., 1 hr (MD/TD) (%) |
|---|---|---|---|---|---|---|---|
| Ex. 1 | Synthesis Example 1 | 95:5 | 2.0 | 9.7 | 425 | 1,245 | 4/3 |
| Ex. 2 | Synthesis Example 1 | 90:10 | 2.0 | 10.4 | 399 | 1,297 | 3/2 |
| Ex. 3 | Synthesis Example 1 | 80:20 | 2.0 | 13.7 | 371 | 1.314 | 3/4 |
| Ex. 4 | Synthesis Example 1 | 75:25 | 2.0 | 15.5 | 353 | 1,359 | 4/3 |

TABLE 1-continued

| | Acrylic copolymer | Inorganic particle: organic filler | Coating thickness (μm) | Adhesive strength (gf) | Moisture content (ppm) | BDV (kV) | Heat shrinkage 150° C., 1 hr (MD/TD) (%) |
|---|---|---|---|---|---|---|---|
| Ex. 5 | Synthesis Example 1 | 50:50 | 2.0 | 20.3 | 312 | 1,494 | 4/4 |
| Comp. Ex. 1 | Synthesis Example 1 | 100:0 (inorganic particles alone) | 2.0 | 8.7 | 434 | 1.217 | 2/3 |
| Comp. Ex. 2 | Synthesis Example 1 | 40:60 | 2.0 | 7.2 | 276 | 1.496 | 45/55 |

(acrylic copolymer:inorganic particle and organic filler = weight ratio of 1:30)

Referring to Table 1, the separators including the acrylic copolymer including a specific structural unit along with the inorganic particles and the organic filler exhibited excellent moisture and withstand voltage characteristics, as a content of the organic filler was increased within a particular range, and particularly, exhibited a shrinkage rate of less than 10% at 150° C. and thus realized excellent heat resistance and adhesion characteristics.

TABLE 2

| Binder (mol% of structural unit) | Adhesive strength to substrate (gf) | Moisture content (ppm) | Heat shrinkage rate 150° C., 1 hr (MD/TD) (%) |
|---|---|---|---|
| Ex. 2 | Acrylic copolymer of Synthesis Example 1 | 10.4 | 399 | 3/2 |
| Comp. Ex. 3 | polyvinyl alcohol (PVA (100)) | 8.1 | 432 | 9/10 |
| Comp. Ex. 4 | Polyvinylpyrrolidone (PVP (100)) | 7.8 | 446 | 15/13 |
| Comp. Ex. 5 | carboxylmethyl cellulose (CMC (100)) | 7.3 | 481 | 11/11 |
| Comp. Ex. 6 | AA(20)/CMC(80) | 8.2 | 497 | 10/11 |
| Comp. Ex. 7 | AA(40)/CMC(20)/VP(40) | 8.6 | 458 | 12/9 |
| Comp. Ex. 8 | AA (100) | 9.5 | 423 | 16/14 |

Referring to Table 2, the separators according to the examples included the acrylic copolymer including a specific structural unit and thus exhibited excellent adhesive strength to a substrate, moisture characteristics, and heat resistance.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A separator for a lithium secondary battery, comprising a porous substrate, and
a coating layer on at least one surface of the porous substrate,
wherein the coating layer comprises
an acrylic copolymer;
an organic filler; and
inorganic particles, wherein the acrylic copolymer comprises a first structural unit derived from (meth)acrylamide, and a second structural unit derived from (meth)acrylic acid or (meth)acrylate, and a third structural unit derived from (meth)acrylamidosulfonic acid or a salt thereof represented by one selected from Chemical Formula 4, Chemical Formula 5, Chemical Formula 6, and a combination thereof,

[Chemical Formula 4]

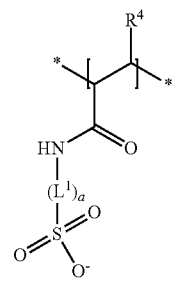

[Chemical Formula 5]

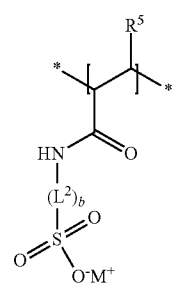

[Chemical Formula 6]

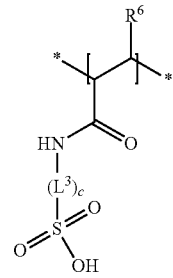

wherein, in Chemical Formula 4 to Chemical Formula 6,
$R^4$ to $R^6$ are each independently hydrogen or a C1 to C6 alkyl group,
$L^1$ to $L^3$ are each independently a substituted or unsubstituted C3 to C10 alkylene group, a substituted or unsubstituted C3 to C20 cycloalkylene group, a substituted or unsubstituted C6 to C20 arylene group, or a substituted or unsubstituted C3 to C20 heterocyclic group, a, b, and c are each independently one of integers of 1 or 2, and M is an alkali metal, wherein the organic filler is included in an amount of 0.1 to 50 wt % based on a total amount of the organic filler and the inorganic particles, and wherein the first structural unit is included in an amount of 55 mol % to 95 mol % based on 100 mol % of the acrylic copolymer, and the total amount of the second structural unit and the third structural unit is included in an amount of 5 mol % to 45 mol % based on 100 mol % of the acrylic copolymer.

2. The separator of claim 1, wherein the coating layer has a thickness of 1 μm to 5 μm.

3. The separator of claim 1, wherein the average particle diameter of the organic filler is 0.1 μm to 0.5 μm.

4. The separator of claim 1, wherein the organic filler is at least one organic compound selected from an acrylate-based compound and a derivative thereof, a diallyl phthalate-based compound and a derivative thereof, a polyimide-based compound and a derivative thereof, a copolymer thereof, and a mixture thereof.

5. The separator of claim 1, wherein the average particle diameter of the inorganic particles is 0.3 μm to 0.7 μm.

6. The separator of claim 1, wherein the inorganic particles comprise $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof.

7. The separator of claim 1, wherein the second structural unit derived from the (meth)acrylic acid or (meth)acrylate is included in an amount of 0 mol % to 40 mol % based on 100 mol % of the acrylic copolymer, and the third structural unit derived from the (meth)acrylamidosulfonic acid or the salt thereof is included in an amount of 0 mol % to 10 mol % based on 100 mol % of the acrylic copolymer.

8. The separator of claim 1, wherein
the first structural unit derived from (meth)acrylamide is represented by Chemical Formula 1, and
the second structural unit derived from the (meth)acrylic acid or (meth)acrylate is represented by one of Chemical Formula 2, Chemical Formula 3, and a combination thereof:

[Chemical Formula 1]

[Chemical Formula 2]

[Chemical Formula 3]

wherein, in Chemical Formula 1 to Chemical Formula 3,
$R^1$ to $R^3$ are each independently hydrogen or a C1 to C6 alkyl group,
$R^7$ is a substituted or unsubstituted C1 to C20 alkyl group.

9. The separator of claim 1, wherein a weight average molecular weight of the acrylic copolymer is 350,000 to 970,000.

10. The separator of claim 1, wherein a volume ratio of the inorganic particle and the organic filler is 40:1 to 1:3.

11. The separator of claim 1, wherein a weight ratio of the acrylic copolymer:organic filler and inorganic particle is 1:20 to 1:40.

12. A lithium secondary battery, comprising
a positive electrode, a negative electrode, and the separator of claim 1 between the positive electrode and the negative electrode.

13. A separator for a lithium secondary battery, comprising
a porous substrate, and
a coating layer on at least one surface of the porous substrate,
wherein the coating layer comprises
an acrylic copolymer;
an organic filler; and
inorganic particles,
wherein the acrylic copolymer comprises a first structural unit derived from (meth)acrylamide, and a second structural unit derived from (meth)acrylic acid or (meth)acrylate, and a third structural unit derived from (meth)acrylamidosulfonic acid or a salt thereof represented by one selected from Chemical Formula 4, Chemical Formula 5, Chemical Formula 6, and a combination thereof,

[Chemical Formula 4]

[Chemical Formula 5]

[Chemical Formula 6]

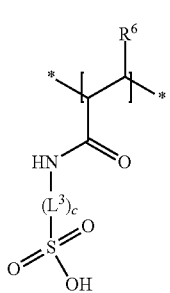

wherein, in Chemical Formula 4 to Chemical Formula 6, R⁴ to R⁶ are each independently hydrogen or a C1 to C6 alkyl group, L¹ to L³ are each independently a substituted or unsubstituted C3 to C10 alkylene group, a substituted or unsubstituted C3 to C20 cycloalkylene group, a substituted or unsubstituted C6 to C20 arylene group, or a substituted or unsubstituted C3 to C20 heterocyclic group, a, b, and c are each independently one of integers of 1 or 2, and M is an alkali metal, wherein the organic filler is included in an amount of 0.1 to 50 wt % based on a total amount of the organic filler and the inorganic particles, and wherein the first structural unit derived from the (meth) acrylamide is included in an amount of 80 mol % to 85 mol % based on 100 mol % of the acrylic copolymer, the second structural unit derived from the (meth) acrylic acid or (meth)acrylate is included in an amount of 10 mol % to 15 mol % based on 100 mol % of the acrylic copolymer, and the third structural unit derived from the (meth)acrylamidosulfonic acid or the salt thereof is included in an amount of 5 mol % to 10 mol % based on 100 mol % of the acrylic copolymer.

\* \* \* \* \*